(12) United States Patent
Hashimoto et al.

(10) Patent No.: US 9,856,021 B2
(45) Date of Patent: Jan. 2, 2018

(54) LIGHTING APPARATUS, LIGHTING SYSTEM, AND MOVING OBJECT

(71) Applicant: PANASONIC INTELLECTUAL PROPERTY MANAGEMENT CO., LTD., Osaka (JP)

(72) Inventors: Naotaka Hashimoto, Osaka (JP); Nobuyuki Matsui, Osaka (JP); Takashi Ohta, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 39 days.

(21) Appl. No.: 15/017,752

(22) Filed: Feb. 8, 2016

(65) Prior Publication Data

US 2016/0238214 A1 Aug. 18, 2016

(30) Foreign Application Priority Data

Feb. 12, 2015 (JP) ................................ 2015-025769
Feb. 12, 2015 (JP) ................................ 2015-025771

(51) Int. Cl.
*F21S 4/00* (2016.01)
*B64D 11/00* (2006.01)
(Continued)

(52) U.S. Cl.
CPC ............... *B64D 11/00* (2013.01); *B60Q 3/43* (2017.02); *G02B 3/0043* (2013.01);
(Continued)

(58) Field of Classification Search
CPC .. B60Q 3/43; B64D 11/00; B64D 2011/0038; G02B 19/0014; G02B 19/0061; G02B 3/0043; G02B 3/0056; G02B 3/08
(Continued)

(56) References Cited

U.S. PATENT DOCUMENTS 8,591,075 B2  11/2013 Nakamura et al.
2005/0063063 A1* 3/2005 Ashdown ............... F21V 5/002
                                                        359/599

(Continued)

FOREIGN PATENT DOCUMENTS

JP    08-313907    11/1996
JP    2011-040299   2/2011
(Continued)

*Primary Examiner* — Thien M Le
(74) *Attorney, Agent, or Firm* — Greenblum & Bernstein, P.L.C.

(57) ABSTRACT

An elongated lighting apparatus includes: a light source (linear light source); and an elongated optical component which transmits light emitted from the light source. The optical component has an elongated entrance surface where the light from the light source enters and an elongated exit surface where the light which has entered the entrance surface exits. The optical component includes light diffusers. Among the light diffusers, at least one of light diffusers disposed near a first end of the optical component diffuses the light from the light source, toward the first end side of the optical component more widely than (i) light diffusers disposed near a second end of the optical component do or (ii) light diffusers disposed near the center of the optical component do. The first and second ends, and the center of the optical component are in the longitudinal direction of the optical component.

16 Claims, 15 Drawing Sheets

(51) Int. Cl.
*G02B 3/00* (2006.01)
*G02B 3/08* (2006.01)
*G02B 19/00* (2006.01)
*B60Q 3/43* (2017.01)

(52) U.S. Cl.
CPC ............ *G02B 3/0056* (2013.01); *G02B 3/08* (2013.01); *G02B 19/0014* (2013.01); *G02B 19/0061* (2013.01); *B64D 2011/0038* (2013.01)

(58) Field of Classification Search
USPC ........................................................ 362/223
See application file for complete search history.

(56) References Cited

U.S. PATENT DOCUMENTS

| | | | | |
|---|---|---|---|---|
| 2005/0207017 | A1* | 9/2005 | Wolfe | G02B 3/0043 359/613 |
| 2005/0265029 | A1* | 12/2005 | Epstein | G02B 3/0056 362/339 |
| 2008/0049165 | A1* | 2/2008 | Min | G02B 3/0043 349/64 |
| 2009/0185107 | A1* | 7/2009 | Panagotacos | G02B 3/0006 349/64 |
| 2012/0212965 | A1 | 8/2012 | Nakamura et al. | |
| 2013/0016526 | A1* | 1/2013 | McCollum | G02B 3/0056 362/607 |
| 2014/0160784 | A1* | 6/2014 | Badahdah | H01L 31/0543 362/558 |

FOREIGN PATENT DOCUMENTS

| | | |
|---|---|---|
| JP | 2012-150886 | 8/2012 |
| JP | 2012-173522 | 9/2012 |
| JP | 2012-209086 | 10/2012 |
| JP | 2012-209088 | 10/2012 |
| JP | 2012-209089 | 10/2012 |
| JP | 2012-209090 | 10/2012 |
| JP | 2012-209091 | 10/2012 |
| JP | 2012-234840 | 11/2012 |
| JP | 2014-053089 | 3/2014 |
| JP | 2014-116236 | 6/2014 |
| WO | 2012/140812 | 10/2012 |

* cited by examiner

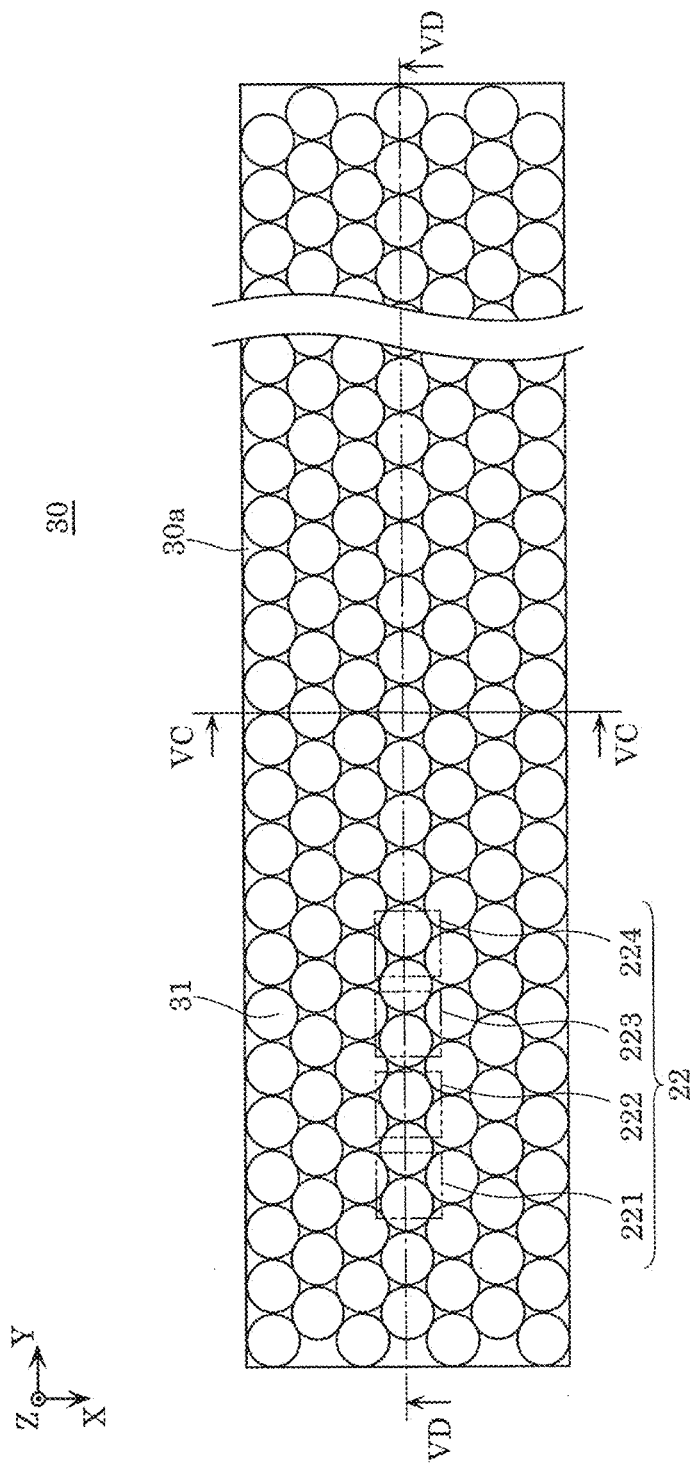

LIGHTING APPARATUS, LIGHTING SYSTEM, AND MOVING OBJECT

CROSS REFERENCE TO RELATED APPLICATION

This application claims the benefit of priorities of Japanese Patent Application Number 2015-025771 filed on Feb. 12, 2015 and Japanese Patent Application Number 2015-025769 filed on Feb. 12, 2015, the entire contents of which are hereby incorporated by reference.

BACKGROUND

1. Technical Field

The present disclosure relates to a lighting apparatus, a lighting system, and a moving object including the lighting apparatus or the lighting system.

2. Description of the Related Art

Some lighting apparatuses provide illumination in a given form using an optical component such as a light guide plate (for example, see Japanese Unexamined Patent Application Publication No. 2014-116236). Such lighting apparatuses include a light source and an optical component which diffuses light from the light source. The light source is, for example, an LED (light-emitting diode) light source which includes a plurality of LED elements. The exit surface of the optical component includes, for example, a plurality of semispherical convex parts each having a diameter ranging from 1 mm to 1.5 mm approximately, as light diffusers.

SUMMARY

Such lighting apparatuses are also used in, for example, moving objects such as airplanes. In the cabin of an airplane, linear LED light sources may be used due to the arrangement space for the lighting apparatuses. For example, a plurality of linear LED light sources are aligned in the longitudinal direction of the light sources, along the longitudinal direction of the cabin of the airplane.

In the case where a plurality of linear LED light sources are aligned in the longitudinal direction of the light sources, a gap is often provided between adjacent linear LED light sources. This generates a dark spot near a region, corresponding to the gap, of the surface illuminated by the light, emitted from the adjacent linear LED light sources. In other words, unevenness of illumination light is caused.

An object of the present disclosure is to provide a lighting apparatus, a lighting system, and a moving object including the lighting apparatus or the lighting system, which can reduce unevenness of illumination light.

In order to achieve the above object, a lighting apparatus according to one aspect of the present invention is a lighting apparatus having an elongated shape. The lighting apparatus includes: a light source; and an optical component which has an elongated shape and transmits light emitted from the light source. The optical component has (i) an elongated entrance surface where the light emitted from the light source enters and (ii) an elongated exit surface where the light which has entered the elongated entrance surface exits. The optical component includes a plurality of light diffusers. Among the plurality of light diffusers, at least one of light diffusers disposed near a first end of the optical component diffuses the light emitted from the light source, toward a first end-side of the optical component more widely than either one of (i) light diffusers disposed near a second end of the optical component and (ii) light diffusers disposed near a center of the optical component do. The first end, the second end, and the center of the optical component are in a longitudinal direction of the optical component.

The present disclosure provides a lighting apparatus, a lighting system, and a moving object including the lighting apparatus or the lighting system, which can reduce unevenness of illumination light.

BRIEF DESCRIPTION OF DRAWINGS

The figures depict one or more implementations in accordance with the present teaching, by way of examples only, not by way of limitations. In the figures, like reference numerals refer to the same or similar elements.

FIG. 5B is a top perspective view of an exemplary configuration of the optical component according to Embodiment 1;

DETAILED DESCRIPTION OF THE EMBODIMENTS

Figure 1:
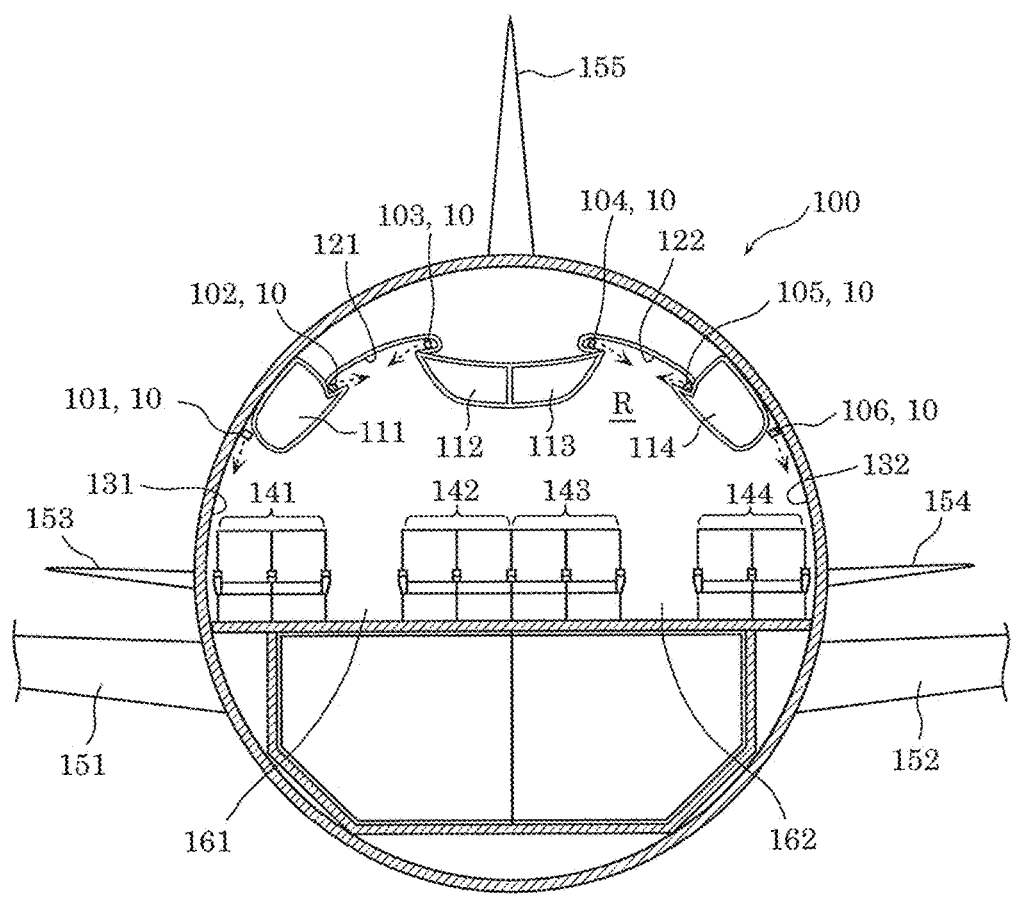
FIG. 1 illustrates an exemplary cross section of a moving object according to Embodiment 1.

Hereinafter, a lighting apparatus, a lighting system, and a moving object including the lighting apparatus or the lighting system according to embodiments of the present disclosure will be described with reference to the drawings. It should be noted that the following embodiments show one specific example of the present disclosure. The numerical values, shapes, materials, structural elements, the arrangement and connection of the structural elements etc. shown in the following embodiments are mere examples, and therefore do not limit the present disclosure. As such, among the structural elements in the following embodiments, structural elements not recited in any one of the independent claims which indicate the broadest concepts of the present disclosure are described as arbitrary structural elements.

Note that the respective figures are schematic diagrams and are not necessarily precise illustrations. Additionally, similar structural elements share like reference numbers in the drawings.

Embodiment 1

A lighting apparatus, a lighting system, and a moving object including the lighting apparatus or the lighting system according to Embodiment 1 will be described with reference to FIG. 1 to FIG. 5D. In Embodiment 1, an example will be described where the moving object is an airplane.

[1-1-1. Configuration of Moving Object]

Figure 2:
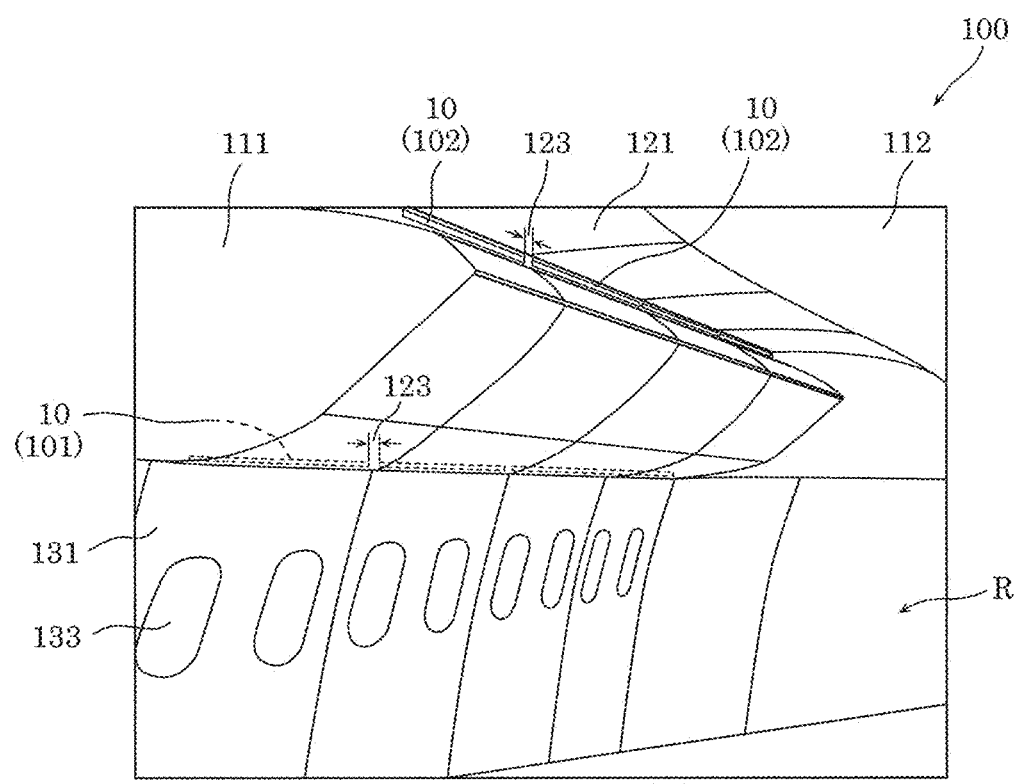
FIG. 2 is a perspective view of an exemplary internal space of the moving object according to Embodiment 1.
Figure 3:
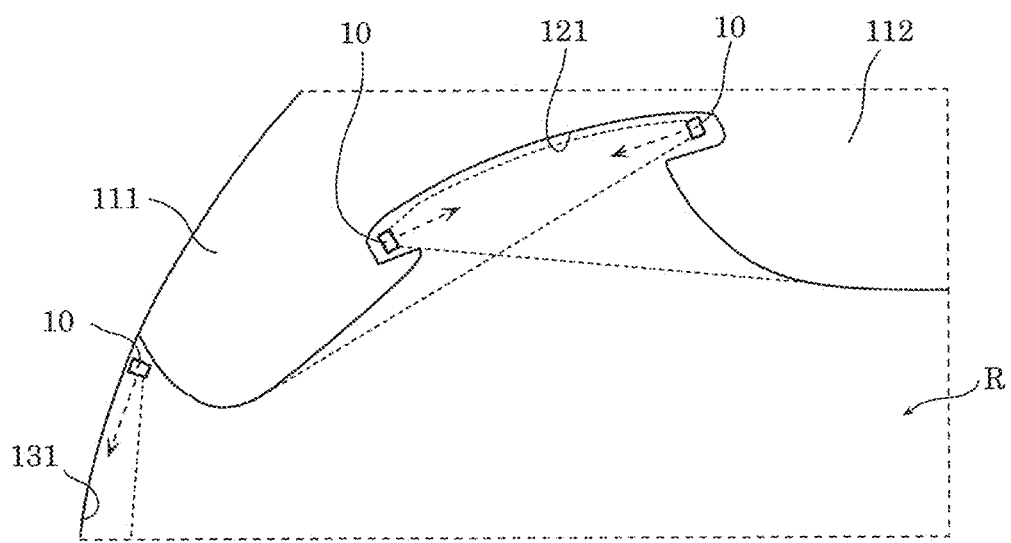
FIG. 3 is a cross-sectional view of an exemplary arrangement of lighting apparatuses in the moving object according to Embodiment 1.

FIG. 1 illustrates an exemplary cross-section of a moving object. FIG. 2 is a perspective view of an exemplary internal space of the moving object. FIG. 3 is a cross-sectional view of an exemplary arrangement of lighting apparatuses in the moving object.

As FIG. 1 to FIG. 3 illustrate, in cabin R of airplane 100, seat groups 141 to 144, a plurality of overhead bins 111 to 114, and lighting systems 101 to 106 are arranged. On outside airplane 100, main wings 151 and 152, horizontal stabilizers 153 and 154, and vertical stabilizer 155 are arranged. Airplane 100 includes a plurality of windows 133 in wall surfaces 131 and 132 of the fuselage of airplane 100.

Each of seat groups 141 to 144 includes two lines of seats along the longitudinal direction of airplane 100. In FIG. 1, seat groups 141 to 144 are arranged across walkways 161 and 162. In FIG. 1, seat group 141 includes two lines of seats between wall surface 131 and walkway 161. Seat group 142 includes two lines of seats between walkway 161 and, seat group 143. Seat group 143 includes two lines of seats between seat group 142 and walkway 162. Seat group 144 includes two lines of seats between walkway 162 and wall surface 132.

Respective overhead ins 111 to 114 are elongated storage for baggage, disposed along the front-back direction of airplane 100. Overhead bins 111 to 114 are disposed so as to correspond to seat groups 141 to 144. Overhead bins 111 to 114 are arranged on the ceiling above corresponding seat groups 141 to 144. Overhead bins 111 and 112 are configured such that doors open toward walkway 161. Overhead bins 113 and 114 are configured such that doors open toward walkway 162.

Each of lighting systems 101 to 106 includes a plurality of lighting apparatuses 10. As described later, lighting apparatuses 10 included in lighting systems 101 to 106 are elongated lighting apparatuses, and are aligned in the longitudinal direction of lighting apparatuses 10 along the front-back direction of airplane 100.

Each lighting apparatus 10 is an elongated lighting apparatus, and houses a linear LED light source and an optical component in an elongated case having a rectangular cross-section. Here, the arrangement positions of lighting apparatuses 10 will be described, and the configurations of lighting apparatuses 10 will be described later.

Lighting system 101 is disposed between wall surface 131 and overhead bin 111, and lighting system 106 is disposed between wall surface 132 and overhead bin 114. Lighting system 102 is disposed between ceiling 121 and overhead bin 111, and lighting system 103 is disposed between ceiling 121 and overhead bin 112. Lighting system 104 is disposed between ceiling 122 and overhead bin 113, and lighting system 105 is disposed between ceiling 122 and overhead bin 114.

Lighting apparatuses 10 included in lighting system 101 emit illumination light toward wall surface 131. Lighting apparatuses 10 included in lighting systems 102 and 103 emit illumination light toward ceiling 121. Lighting apparatuses 10 included in lighting systems 104 and 105 emit illumination light toward ceiling 122. Lighting apparatuses 10 included in lighting system 106 emit illumination light toward wall surface 132.

More specifically, a plurality of lighting apparatuses 10 included in lighting system 101 are arranged between wall surface 131 and overhead bin 111 in such a manlier that illumination light travels toward wall surface 131. A plurality of lighting apparatuses 10 included in lighting system 102 are arranged between ceiling 121 and overhead bin ill in such a manner that illumination light travels toward ceiling 121. A plurality of lighting apparatuses 10 included in lighting system 103 are arranged between ceiling 121 and overhead bin 112 in such a manner that illumination light travels toward ceiling 121. A plurality of lighting apparatuses 10 included in lighting system 104 are arranged between ceiling 122 and overhead bin 113 in such a manner that illumination light travels toward ceiling 122. A plurality of lighting apparatuses 10 included in lighting system 105 are arranged between ceiling 122 and overhead bin 114 in such a manner that illumination light travels toward ceiling 122. A plurality of lighting apparatuses 10 included in lighting system 106 are arranged between wall surface 132 and overhead bin 114 in such a manner that illumination light travels toward wall surface 132.

As FIG. 2 illustrates, gap 123 is provided between lighting apparatuses 10 included in lighting systems 101 and 102. This secures necessary space for installation of lighting apparatuses 10. Although not illustrated, lighting systems 103 to 106 similarly include gap 123 between lighting apparatuses 10.

In a moving object such as airplane 100, instead of causing lighting apparatuses 10 to emit illumination light directly toward seat groups 141 to 144, seat groups 141 to 144 are illuminated by light reflected off ceiling 121, ceiling 122, wall surface 131, or wall surface 132.

[1-1-2. Configuration of Lighting Apparatus]

Figure 4A:
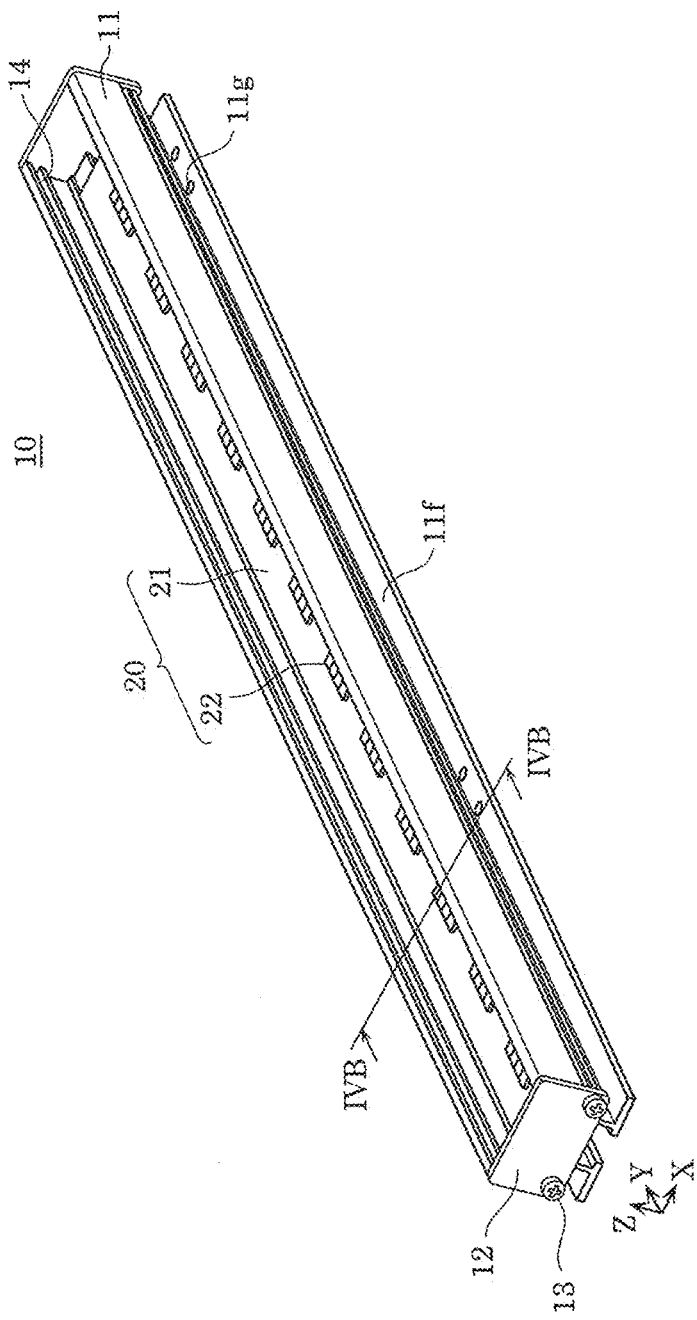
FIG. 4A is a perspective view of an exemplary appearance of a lighting apparatus according to Embodiment 1.
Figure 4B:
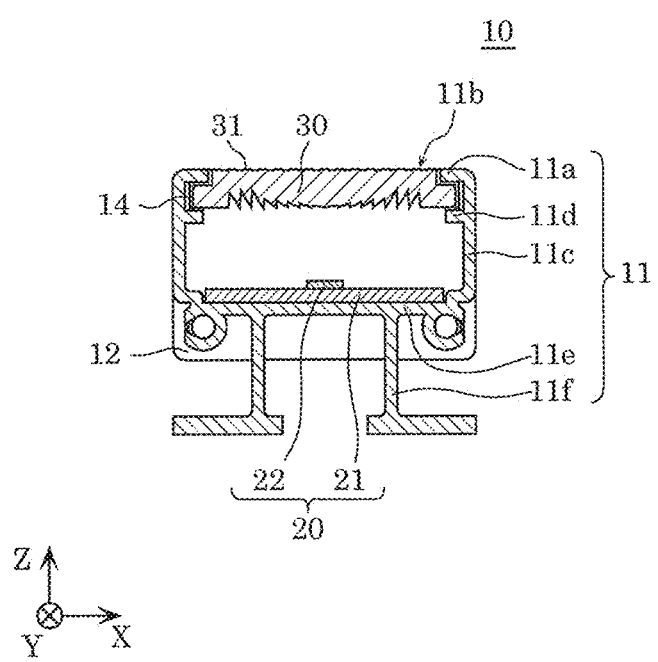
FIG. 4B is a cross-sectional view of an exemplary configuration of the lighting apparatus according to Embodiment 1.

FIG. 4A is a perspective view of an exemplary appearance of a lighting apparatus according to Embodiment 1. FIG. 4B is a cross-sectional view of an exemplary configuration of the lighting apparatus according to Embodiment 1.

In FIG. 4A and FIG. 4B, the Z-axis direction is the direction in which illumination light is output, that is, the direction of the axis of distribution of illumination light. In the following description, the direction of the axis of the light distribution may also be simply referred to as light distribution direction.

As described later, case 11 of each lighting apparatus 10 has an elongated shape. In FIG. 4A and FIG. 4B, the Y-axis is an axis parallel to the longitudinal direction of case 11 and orthogonal to the Z-axis. The X-axis is an axis orthogonal to the Y-axis and the Z-axis.

In order to facilitate illustration, FIG. 4A illustrates lighting apparatus 10 with optical component 30 removed. FIG. 4B illustrates the cross-section of lighting apparatus 10 parallel to the X-Z plane including line IVB-IVB in FIG. 4A, seen from the negative Y-axis side. FIG. 4B illustrates lighting apparatus 10 with optical component 30 attached.

As FIG. 4B illustrates, lighting apparatus 10 includes case 11, linear light source 20, and optical component 30.

Case 11 is a component which houses linear light source 20 and optical component 30. Case 11 is an elongated component having a rectangular cross section parallel to the X-Z plane.

Top face 11a of case 11 has rectangular opening 11b. Of two faces parallel to the X-Y plane, top face 11a is the face on the positive Z-axis side. Opening 11b is an opening for allowing light emitted from linear light source 20 to exit case 11.

End faces (faces parallel to the X-Z plane) of case 11 are opened. The opened end faces are covered with side plates 12 having rectangular surfaces. When assembling lighting apparatus 10, linear light source 20 and optical component 30 are inserted into case 11 through the opened end faces. After linear light source 20 and optical component 30 are housed in case 11, the end faces are covered with side plates 12. The shape of the surfaces of side plates 12 is approximately the same as the shape of the end faces of case 11. Side plates 12 are fixed to case 11 by screws 13.

Each of side faces 11e of case 11 parallel to the Y-Z plane includes rib 11d for supporting optical component 30. Rib 11d is a plate-like projection which extends toward inside case 11 from side face 11c. The plane of rib 11d parallel to the X-Y plane is rectangular. The length of rib 11d in the Y-axis direction is the same as the length of case 11 in the Y-axis direction. The length of rib 11d in the X-axis direction is determined so that the distance between two ribs 11d is longer than the length of opening 11b of top face 11a in the X-axis direction. In other words, as FIG. 4B illustrates, the length of rib 11d in the X-axis direction is shorter than the length of top face 11a in the X-axis direction (the length from side face 11c to opening 11b).

End portions 30d of optical component 30 to be described later are inserted between top face 11a and ribs 11d of case 11. The internal length of case 11, the length of linear light source 20, and the length of optical component 30, in the X-axis direction are substantially the same. The length of opening 11b in the X-axis direction and the distance between two ribs 11d are shorter than the length of optical component 30 in the X-axis direction. The area of the region of top face 11a which contacts optical component 30 (in the X-axis direction) and the area of the region of rib 11d which contacts optical component 30 are the areas necessary for fixing optical component 30.

Bottom face 11e of case 11 includes a recess in which linear light source 20 can be disposed. The depth of the recess is less than the thickness of substrate 21 of linear light source 20. Linear light source 20 is fixed to case 11 by adhesive, screws, or combination thereof.

Legs 11f are disposed below bottom face 11e (the negative Z-axis side) for fixing lighting apparatus 10 to ceiling 121, ceiling 122, wall surface 131, or wall surface 132 of airplane 100. Legs 11f have a plurality of circular openings 11g for screwing lighting apparatus 10 to ceiling 121, ceiling 122, wall surface 131, or wall surface 132.

As FIG. 4A and FIG. 4B illustrate, linear light source 20 includes plurality of LED groups 22 on plate-like substrate 21 having an elongated surface. In Embodiment 1, each of LED groups 22 includes LED elements of four colors, which are red LED element 221, green LED element 222, blue LED element 223, and white LED element 224 (not illustrated in FIG. 4A and FIG. 4B, see FIG. 5B).

Four LED elements 221, 222, 223, and 224 are an example of the light-emitting elements. In Embodiment 1, LED elements 221, 222, 223, and 224 are aligned along a straight line which is parallel to the longitudinal direction of substrate 21 and which passes the center of substrate 21.

Moreover, in Embodiment 1, a plurality of LED groups 22 are arranged along the straight line (see FIG. 5B).

LED elements 221, 222, 223, and 224 need not be linearly arranged. Any other arrangement may also be used such as an arrangement in which each LED group 22 includes four LED elements 221, 222, 223, and 224 arranged in a matrix of 2×2.

Optical component 30 is a light-transmissive component which transmits light emitted from linear light source 20. Optical component 30 has an exit surface (on the positive Z-axis side) which includes a plurality of light diffusers 31. Optical component 30 will be described in detail below.

[1-1-3. Configuration of Optical Component]

Optical component 30 will be described with reference to FIG. 5A to FIG. 5D.

Figure 5A:
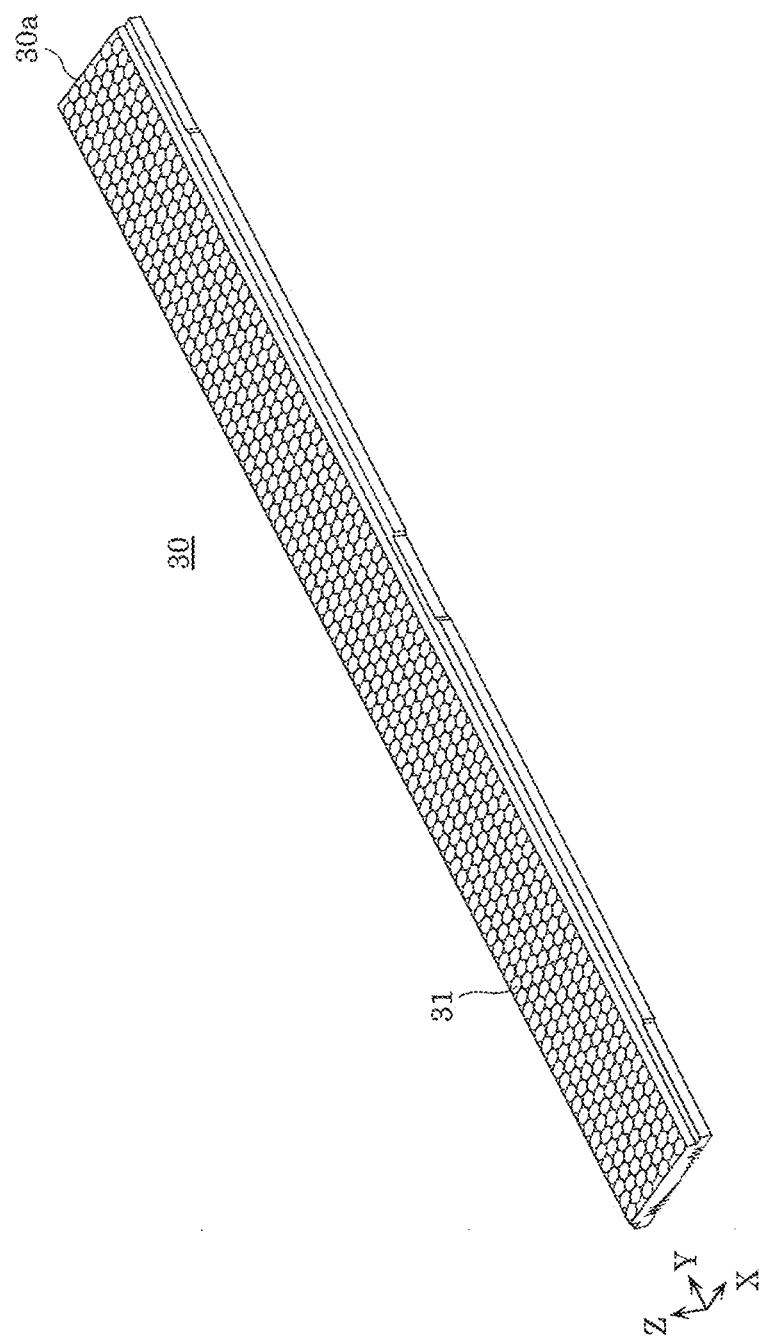
FIG. 5A is a perspective view of an exemplary appearance of an optical component according to Embodiment 1.
Figure 5C:
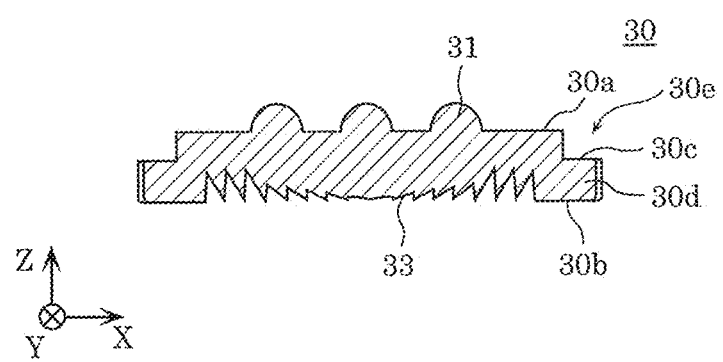
FIG. 5C is a cross-sectional view of an exemplary configuration of the optical component according to Embodiment 1.
Figure 5D:
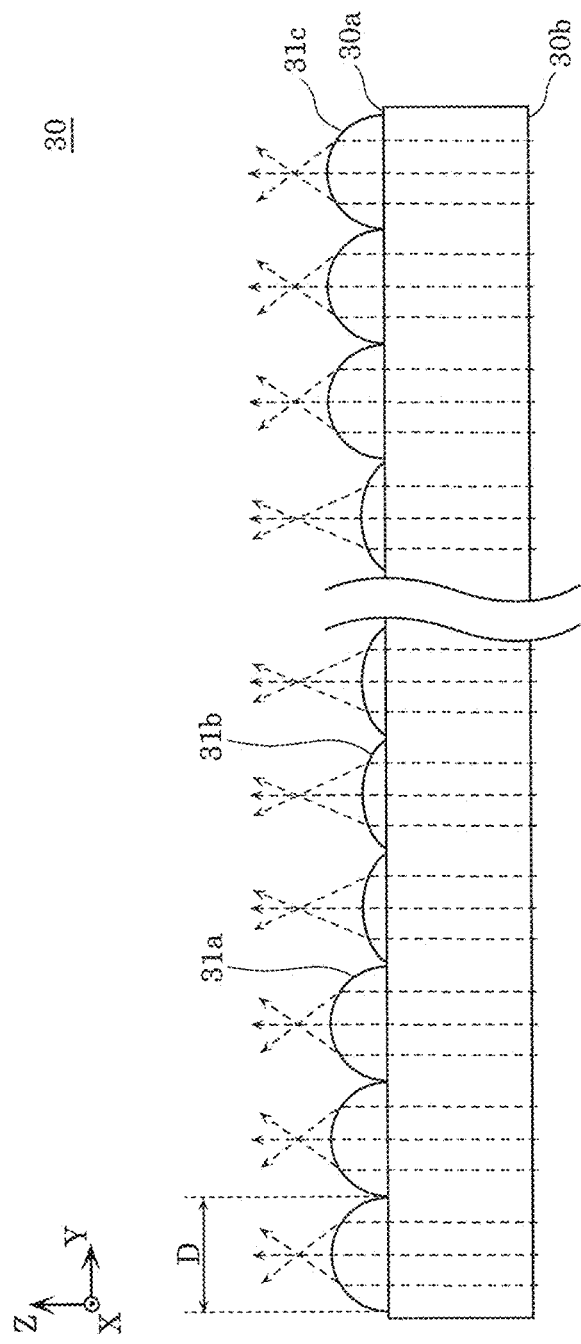
FIG. 5D is another cross-sectional view of the exemplary configuration of the optical component according to Embodiment 1.

FIG. 5A is a perspective view of an exemplary appearance of optical component 30 according to Embodiment 1. FIG. 5B is a top perspective view of an exemplary configuration of optical component 30 according to Embodiment 1. FIG. 5C is a cross-sectional view of an exemplary configuration of optical component 30 according to Embodiment 1. FIG. 5C illustrates a cross-section of optical component 30 in a plane parallel to the Z-axis including line VC-VC in FIG. 5B. FIG. 5D is another cross-sectional view of the exemplary configuration of optical component 30 according to Embodiment 1. FIG. 5D illustrates a cross-section of optical component 30 in a plane parallel to the Z-axis including line VD-VD in FIG. 5B.

As FIG. 5A to FIG. 5D illustrate, optical component 30 is an example of a light-transmissive component which transmits light emitted from linear light source 20. Optical component 30 according to Embodiment 1 diffuses outgoing light in the longitudinal direction (Y-axis direction), and condenses outgoing light to a certain degree in the X-axis direction orthogonal to the longitudinal direction. Diffusing the outgoing light in the longitudinal direction reduces unevenness of brightness caused between (i) a region between one lighting apparatus 10 and another lighting apparatus 10 and (ii) a region directly illuminated by lighting apparatus 10. Moreover, condensing the outgoing light to a certain degree in the X-axis direction allows a large amount of light to be efficiently emitted to the ceiling or a wall.

Optical component 30 is a plate-like component having a rectangular plane (which is parallel to the X-Y plane). Optical component 30 has, for example, a length ranging from 15 cm to 30 cm in the longitudinal direction (Y-axis direction), a length of approximately 3 cm in the X-axis direction, and a thickness of approximately 3 mm.

The materials of optical component 30 are not particularly limited, as long as they are light-transmissive materials. In Embodiment 1, optical component 30 is made of polycarbonate. Optical component 30 may be made of acrylic, silicone, glass, or the like.

Optical component 30 has: elongated entrance surface 30b where light from linear light source 20 enters; and elongated exit surface 30a where light which has enter trance surface 30b exits.

Entrance surface 30b includes a plurality of grooves 33 which form a Fresnel lens. In other words, entrance surface 30b of optical component 30 includes a Fresnel lens which condenses light, which has entered entrance surface 30b, in the direction perpendicular to the longitudinal direction of optical component 30. Grooves 33 include, for example, entrance portions where light from linear light source 20 directly enters, and reflective portions which reflect light which has entered the entrance portions.

Exit surface 30a includes a plurality of light diffusers 31. Each of light diffusers 31 has a convex curved surface. In Embodiment 1, light diffuser 31 is a substantially spherical convex portion having a diameter ranging from 1.0 mm to 2.0 mm, and a height of approximately 0.1 mm. With such light diffusers 31, light emitted from linear light source 20 and entered optical component 30 is output and diffused. This reduces unevenness of light output from optical component 30. More specifically, the above configuration can reduce various types of unevenness of light that appear on the surface illuminated by light from optical component 30. Examples of such unevenness include unevenness of light which appears lineally, spotted unevenness of light corresponding to respective LED elements, and color unevenness caused because respective LED elements emit light of different colors. Additionally, unevenness that appears on exit surface 30a of optical component 30 is also reduced. In other words, the above configuration reduces unevenness that appears on exit surface 30a, such as spotted unevenness corresponding to respective LED elements, and color unevenness caused because respective LED elements emit light of different colors. The shape of light diffuser 31 is not limited to the substantially spherical convex, but may be conical, triangular pyramid, or concave. When the area of the base of light diffuser 31 is approximately 2 mm$^2$, and the base is circular, the diameter ranges, for example, from 0.2 mm to 2 mm approximately. Light diffusers 31 may have different sizes. In order to facilitate understanding of the effects of optical diffusers 31, each figure illustrates optical diffusers 31 with height significantly greater than the actual height.

As described above, light diffusers 31 used to cause optical component 30 to diffuse light can reduce unevenness of illumination light (or unevenness which appears on the surface illuminated by light) with a relatively low loss. Moreover, as light diffusers 31 are highly-reproducible, lighting apparatus 10 having a desired light distribution angle can be reproducibly manufactured.

FIG. 5B illustrates an arrangement of light diffusers 31 and an arrangement of LED elements 221 to 224. As FIG. 5B illustrates, the direction in which LED elements are arranged is substantially the same as the direction in which light diffusers 31 are arranged. However, these directions may intersect one another in plan view of exit surface 30a. Unevenness of light output from optical component 30 is further reduced by the intersection of the arrangement direction of the LED elements with the arrangement direction of light diffusers 31 at an angle less than 90 degrees.

As FIG. 5C illustrates, edges 30d of exit surface 30a of optical component 30 in the X-axis direction include cutouts 30e having rectangular X-Z planes. The shape of cutouts 30e depends on the shape of top face 11a of case 11. In other words, cutouts 30e are provided in the regions which contact exit surface 30a. With such a structure, exit surface 30e covers opening 11b of case 11. Moreover, edges 30d of optical component 30 in the X-axis direction are inserted between top face 11a and ribs 11d of case 11, and optical component 30 is fixed to case 11. Cutouts 30e are provided such that the level difference between edge top face 30c which is the top face of edge 30d in the X-axis direction and exit surface 30a is substantially the same as the thickness of top face 11a of case 11.

As FIG. 5D illustrates, the shapes of light diffusers 31 vary depending on the position of light diffuser 31 on optical component 30 in the longitudinal direction of optical component 30. Specifically, light diffusers 31 have light distribution angles, in the longitudinal direction, which are greater near a first end of optical component 30 than near the center of optical component 30. The first end and the center of optical component 30 are in the longitudinal direction of optical component 30. In Embodiment 1, light diffusers 31 have light distribution angles, in the longitudinal direction, which are greater near a second end of optical component 30 than near the center of optical component 30. The second end of optical component 30 is in the longitudinal direction of optical component 30. Specifically, in Embodiment 1, the light distribution angles, in the longitudinal direction (Y-axis direction), of light diffusers 31a disposed near the first end and light diffusers 31c disposed near the second end of optical component 30 direction) are greater than those of light diffusers 31b disposed near the center. Accordingly, in Embodiment 1, among a plurality of light diffusers 31, at least one of light diffusers 31a disposed near the first end of optical component 30 diffuses light from linear light source 20, toward the first end side more widely than light diffusers 31b disposed near the center of optical component 30 do. Here, the light distribution angle of light diffuser 31 refers to the angle of distribution of light output from light diffuser 31 when light enters light diffuser 31 in the positive Z-axis direction. The term "near the first end" refers to that the distance from the first end is approximately 30% or less of the longitudinal length of optical component 30. The similar definition also applies to the terms "near the second end" and "near the center".

In order to achieve such light distribution properties, in Embodiment 1, as FIG. 5D illustrates, each of light diffuser 31a, 31b, and 31c has a substantially spherical curved surface. The radius of curvature of the curved surface of each of light diffusers 31a and 31c disposed near the first and second ends of optical component 30 is less than that of the curved surface of each of light diffusers 31b disposed near the center of optical component 30. Accordingly, as the dashed arrows in FIG. 5D illustrate, light, is refracted by light diffusers 31a, 31b, and 31c, leading to the above described light distribution properties.

Figure 6:
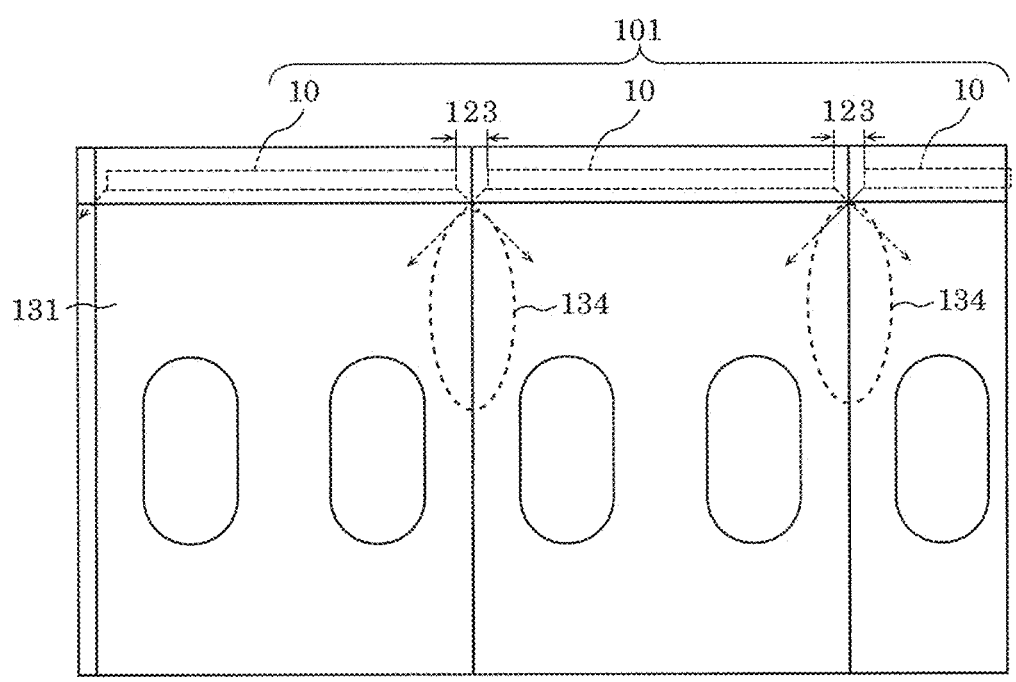
FIG. 6 illustrates a wall surface of an airplane which includes a lighting system according to Embodiment 1.

As described above, light emitted from near longitudinal first and second ends of lighting apparatus 10 is diffused in the longitudinal direction of lighting apparatus 10. In other words, wider diffusion of light in the Y-axis direction of lighting apparatus 10 in FIG. 4A is provided. Accordingly, in the lighting system where two lighting apparatuses 10 are longitudinally aligned, uneven illuminance caused near gap 123 between two lighting apparatuses 10 can be reduced. Now effects of reducing uneven illuminance of lighting apparatus 10 will be described with reference to FIG. 6. FIG. 6 illustrates wall surface 131 of airplane 100 including lighting system 101 according Embodiment 1. As FIG. 6 illustrates, light is diffused as indicated by the dashed arrows, at the longitudinal ends of lighting apparatuses 10 included in lighting system 101. Hence, the regions near gaps 123 between two lighting apparatuses 10 which are longitudinally aligned are also illuminated by light, which reduces uneven illumination on wall surface 131 which is the illuminated surface. In particular, as FIG. 6 illustrates, lighting system 101 is configured such that regions 134 each illuminated by light from two lighting apparatuses 10 longitudinally aligned are formed. As a result, illuminance in region 134 is increased. Accordingly, the difference in illuminance between regions 134 and other illuminated regions are reduced, leading to a further reduction in uneven illumination on wall surface 131.

In the above description, the light distribution angles, in the longitudinal direction, of light diffusers 31a and 31c disposed near the first and second ends of optical component 30 are greater than those of light diffuser 31b disposed near the center of optical component 30. However, it may be that only the light distribution angles, in the longitudinal direction, of light diffusers 31a disposed near the first end is greater than those of light diffusers 31b disposed near the center. It may also be that the light distribution angles of light diffusers 31a disposed near the first end are different from the light distribution angles of light diffusers 31c disposed near the second end. Such configurations can also increase light diffusion of lighting apparatus 10 in the longitudinal direction.

[1-2. Variation 1 of Embodiment 1]

A lighting apparatus according to Variation 1 of Embodiment 1 will be described with reference to FIG. 7. In the lighting apparatus according to Variation 1 of Embodiment 1, the configurations of light distribution angles of light diffusers are different from those of light diffusers 31 of lighting apparatus 10 according to Embodiment 1. The other configurations are similar to those of lighting apparatus 10 according to Embodiment 1. An optical component according to Variation 1 of Embodiment 1 will be described below.

Figure 7:
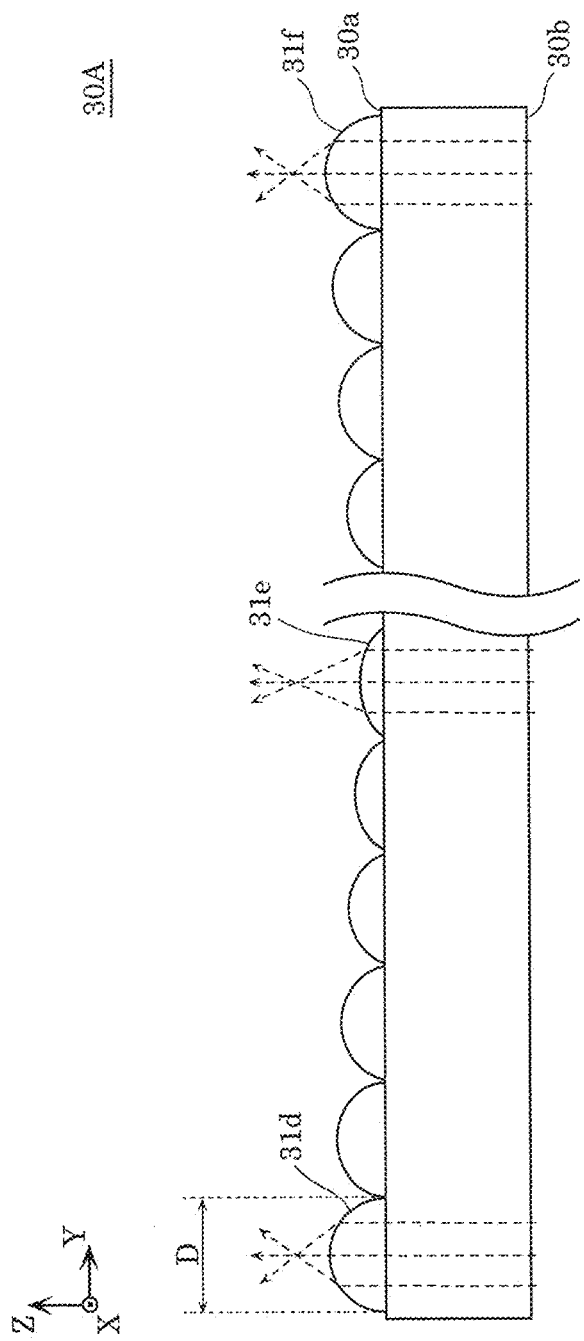
FIG. 7 is a cross-sectional view of a configuration of an optical component according to Variation 1 of Embodiment 1.

FIG. 7 is a cross-sectional view of a configuration of optical component 30A according to Variation 1 of Embodiment 1. FIG. 7 is a cross-sectional view which corresponds to the cross-sectional view of optical component 30 illustrated in FIG. 5D according to Embodiment 1.

As FIG. 7 illustrates, the light distribution angles of light diffusers of optical component 30A according to Variation 1 of Embodiment 1 gradually increase from the center toward a first end of optical component 30A. The center and the first end of optical component 30A are in the longitudinal direction of optical component 30A. The light distribution angles of light diffusers also gradually increase from the center toward a second end of optical component 30A. The second end of optical component 30A is in the longitudinal direction of optical component 30A. In other words, in optical component 30A according to Variation 1 of Embodiment 1 in FIG. 7, among a plurality of light diffusers, for example, light diffusers, disposed in a region from the center in the Y-axis direction to the end of optical component 30A on the negative Y-axis side, have light distribution angles which gradually increase from the center toward the end. Moreover, in Variation 1 of Embodiment 1 in FIG. 7, light diffusers, disposed in a region from the center in the Y-axis direction to the end of optical component 30A on the positive Y-axis side, have light distribution angles which gradually increase from the center toward the end. In Variation 1 of Embodiment 1, too, among a plurality of light diffusers, at least one of light diffusers disposed near the first end of optical component 30A diffuses light, from linear light source 20, toward the first end side more widely than light diffusers disposed near the center of optical component 30A do.

In order to achieve such light distribution properties, in Variation 1 of Embodiment 1, as FIG. 7 illustrates, each light diffuser has a substantially spherical curved surface. The radius of curvature of the curved surface gradually decreases from the center toward the first and second ends of optical component 30A. With this, as indicated by the clashed arrows in FIG. 7, light is diffracted by light diffusers 31d, 31e, and 31f, leading to the above light distribution properties.

In the example illustrated in FIG. 7, light diffusers are substantially the same in diameter D in the Y-axis direction (and X-axis direction). The term "light diffusers are substantially the same in diameter D" described above refers to that each light diffuser has a difference in diameter D that is approximately 20% or less from the average value of diameter D. Here, diameter D of each light diffuser can be optimized based on, for example, the size of linear light source 20, and thus, diameter D of each light diffuser can be optimized.

In Variation 1 of Embodiment 1, too, light emitted from lighting apparatus 10 is diffused in the longitudinal direction of lighting apparatus 10. Accordingly, in the lighting system where two lighting apparatuses 10 are longitudinally aligned, uneven illuminance caused near gap 123 between two lighting apparatuses 10 can be reduced. Moreover, in Variation 1 of Embodiment 1, since the light distribution angles of light diffusers gradually increase from the center toward the first end of optical component 30A, the difference in light distribution angle between adjacent light diffusers can be reduced. This can further reduce unevenness of illumination light of lighting apparatus 10.

In the description in Variation 1 of Embodiment 1 above, the light distribution angles of light diffusers gradually increase from the center toward the first and second ends of optical component 30A. However, it may be that the light distribution angles of light diffusers increase from the center toward the first end, but does not increase from the center toward the second end. It may also be that the light distribution angles of light diffusers 31d disposed near the first end are different from those of light diffusers 31f disposed near the second end. Such configurations can also provide wider light diffusion of lighting apparatus 10 in the longitudinal direction.

[1-3. Variation 2 of Embodiment 1]

A lighting apparatus according to Variation 2 of Embodiment 1 will be described with reference to FIG. 8. In the lighting apparatus according to Variation 2 of Embodiment 1, the configurations of the light distribution angles of light diffusers are different from those of light diffusers 31 of lighting apparatus 10 according to Embodiment 1. The other configurations are similar to those of lighting apparatus 10 according to Embodiment 1. An optical component according to Variation 2 of Embodiment 1 will be described below.

Figure 8:
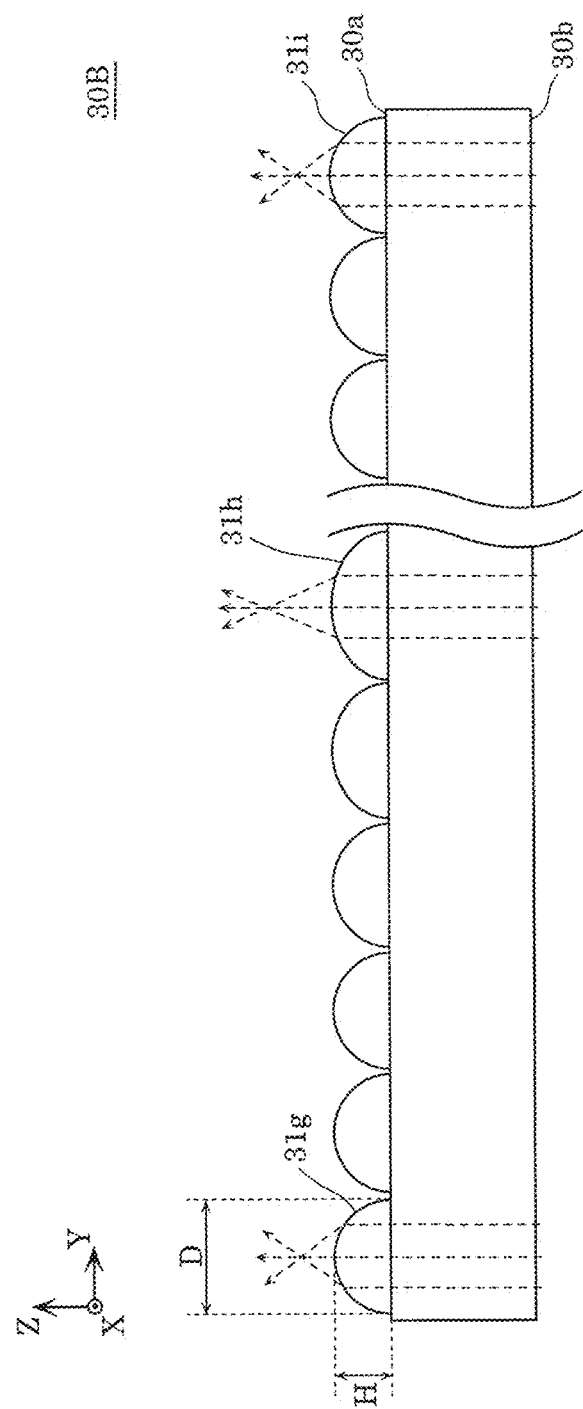
FIG. 8 is a cross-sectional view of a configuration of an optical component according to Variation 2 of Embodiment 1.

FIG. 8 is a cross-sectional view of a configuration of optical component 30B according to Variation 2 of Embodiment 1. FIG. 8 is a cross-sectional view which corresponds to the cross-sectional view of optical component 30 illustrated in FIG. 5D according to Embodiment 1.

As FIG. 8 illustrates, in a similar manner to optical component 30A according to Variation 1 of Embodiment 1, the light distribution angles of light diffusers of optical component 30B according to Variation 2 of Embodiment 1 gradually increase from the center toward a first end of optical component 30B. Here, the center and the first end of optical component 30B are in the longitudinal direction of optical component 30B. The light distribution angles of light diffusers also gradually increase from the center toward a second end of optical component 30B. The second end of optical component 30B is in the longitudinal direction of optical component 30B. In Variation 2 of Embodiment 2, light diffusers are substantially the same in height H in the Z-axis direction (that is, the thickness direction of optical component 30B). The term "light diffusers are substantially the same in height H" described above refers to that each light diffuser has height H which has a difference of approximately 20% or less from the average value of height H.

In the example illustrated in FIG. 8, height H of each spherical light diffuser 31h disposed near the center of optical component 30B in the Y-axis direction (longitudinal direction) is substantially the same as height H of each of spherical light diffusers 31g and 31i which are disposed near the first and second ends of optical component 30B in the Y-axis direction. The radius of curvature of the curved surface of light diffuser 31h is greater than those of light diffusers 31g and 31i. The radius of curvature of the curved surface of each light diffuser gradually decreases from the center to the first end in the Y-axis direction. In response to the gradual decrease, the light distribution angles of light diffusers gradually increase from the center toward the first end. In Variation 2 of Embodiment 1, too, among a plurality of light diffusers, at least one of light diffusers disposed near the first end of optical component 30B diffuses light from linear light source 20, toward the first end side more widely than the light diffusers disposed near the center do.

With this, the flatness of exit surface 30a of optical component 30B increases. This can reduce a feeling of strangeness which is perceived by a user when the user sees optical component 30B and which is caused due to, for example, inclination of exit surface 30a.

In Variation 2 of Embodiment 1, diameter D of each light diffuser of optical component 30B in the Y-axis direction (and the X-axis direction) gradually decreases from the center toward the first and second ends of optical component 30B.

In Variation 2 of Embodiment 1, too, light emitted from lighting apparatus 10 is diffused in the longitudinal direction of lighting apparatus 10. Accordingly, in the lighting system where two lighting apparatuses 10 are longitudinally aligned, uneven illuminance caused near gap 123 between two lighting apparatuses 10 can be reduced. Moreover, in Variation 2 of Embodiment 1, since the light distribution angles of light diffusers gradually increase from the center toward the first end of optical component 30B, the difference in light distribution angle between adjacent light diffusers can be reduced. This can further reduce unevenness of illumination light of lighting apparatus 10.

In the description in Variation 2 of Embodiment 1 above, the light distribution angles of light diffusers gradually increase from the center toward the first and second ends of optical component 30B. However, it may be that the light distribution angles of light diffusers increase from the center toward the first end, but does not increase from the center toward the second end. It may also be that the light distribution angles of light diffusers 31g disposed near the first end are different from those of light diffusers 31i disposed near the second end. Such configurations can also provide wider light diffusion of lighting apparatus 10 in the longitudinal direction.

[1-4. Advantageous Effects Etc.]

As described above, lighting apparatus 10 according to Embodiment 1 has an elongated shape, and includes linear light source 20 and elongated optical component 30 which transmits light emitted from linear light source 20. Optical component 30 has: elongated entrance surface 30b where light from linear light source 20 enters; and elongated exit surface 30a where light which has entered entrance surface 30b exits. Optical component 30 includes a plurality of light diffusers 31. Among a plurality of light diffusers 31, at least one of light diffusers 31 disposed near the first end of optical component 30B in the longitudinal direction diffuses light from linear light source 20, toward the first end side more widely than light diffusers 31 disposed near the center of optical component 30 in the longitudinal direction do.

As described above, lighting apparatus 10 according to Embodiment 1, Variation 1, and Variation 2, includes the optical component including a plurality of light diffusers. This can reduce unevenness of illumination light. Moreover, lighting apparatus 10 can diffuse light in the longitudinal direction. Hence, even when a plurality of lighting apparatuses 10 are longitudinally aligned, it is possible to reduce generation of unevenness (dark spot) near gap 123 between adjacent lighting apparatuses 10.

Moreover, in lighting apparatus 10 according to Embodiment 1, the light distribution angles, in the longitudinal direction, of light diffusers 31 of optical component 30 are greater near the first end than near the center of optical component 30.

As described above, since the light distribution angles, in the longitudinal direction, of the light diffusers disposed near the first end of optical component. 30 is greater, light can be diffused relatively widely in the longitudinal direction, near the first end of optical component 30. Accordingly, even when a plurality of lighting apparatuses 10 are longitudinally aligned, it is possible to reduce generation of unevenness (dark spot) near gap 123 between adjacent lighting apparatuses 10.

Moreover, in lighting apparatus 10 according to Embodiment 1, it may be that the light distribution angles of light diffusers 31 gradually increase from the center toward the first end of optical component 30.

This can reduce the difference in light distribution angle between adjacent light diffusers, leading to a further reduction in unevenness of illumination light of lighting apparatus 10.

Moreover, in lighting apparatus 10 according to Embodiment 1, it may be that each light diffuser has a substantially spherical curved surface. The radius of curvature of the curved surface near the first end may be less than that of the curved surface near the center of optical component 30.

Moreover, in lighting apparatus 10 according to Embodiment 1, light diffusers may be substantially the same in height in the thickness direction of optical component 30B.

With this, the flatness of exit surface 30a of optical component 30B increases. This can reduce a feeling of strangeness which is perceived by a user when the user sees optical component 30B and which is caused due to, for example, inclination of exit surface 30a.

Embodiment 2

Next, Embodiment 2 will be described with reference to FIG. 9. In a lighting apparatus according to Embodiment 2, the configurations of a plurality of light diffusers are different from those of lighting apparatus 10 according to Embodiment 1. The other configurations are similar to those of lighting apparatus 10 according to Embodiment 1. An optical component according to Embodiment 2 will be described below.

[2-1. Configuration of Optical Component]

Figure 9:
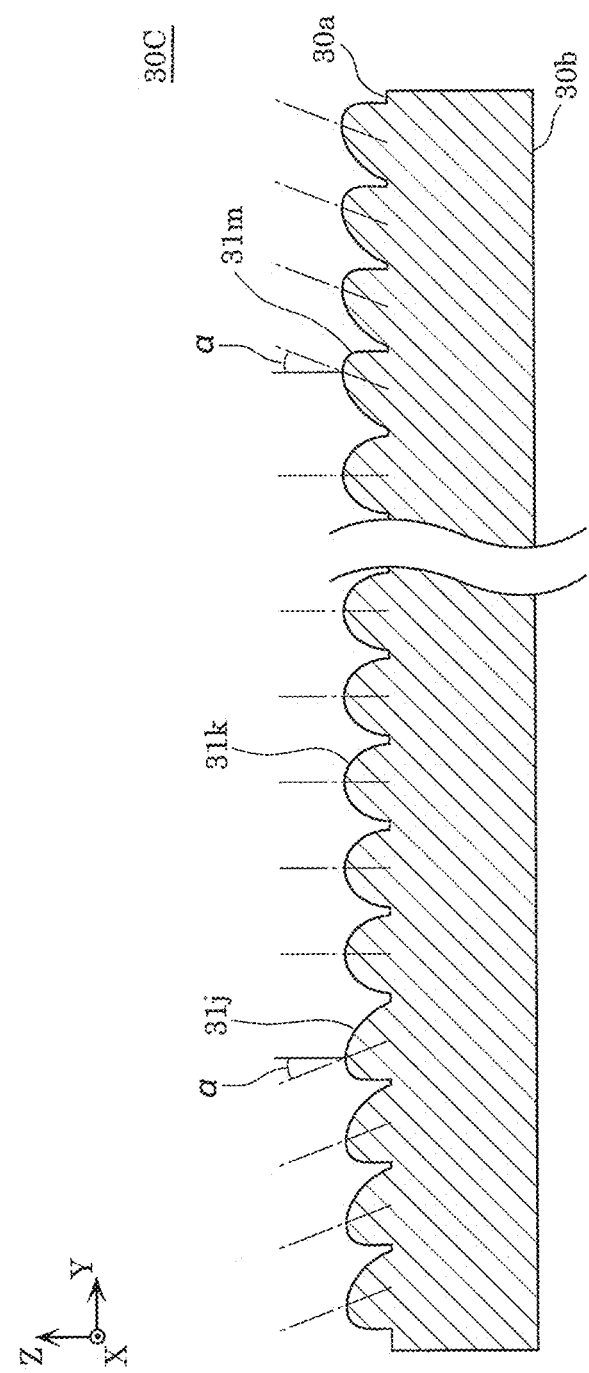
FIG. 9 is a cross-sectional view of an exemplary configuration of an optical component according to Embodiment 2.

FIG. 9 is a cross-sectional view of a configuration of optical component 30C according to Embodiment 2.

As FIG. 9 illustrates, the shapes of light diffusers vary depending on the position on optical component 30C in the longitudinal, direction. Specifically, among a plurality of light diffusers, each light diffuser 31j, disposed near a first end of optical component 30C, has a light distribution direction which is inclined toward the first end with respect to the light distribution direction of the lighting apparatus (see dotted and dashed lines in FIG. 9). The first end of optical component 30C is in the longitudinal direction of optical component 30C. In other words, in FIG. 9, among a plurality of light diffusers, each light diffuser 31j, disposed near the end of optical component 30C on the negative Y-axis side, has a light distribution direction which is inclined toward the negative Y-axis with respect to the positive Z-axis direction which is the light distribution direction of the lighting apparatus. With this, in Embodiment 2, among a plurality of light diffusers, at least one of light diffusers 31*j* disposed near the first end of optical component 30C diffuses light from linear light source 20, toward the first end side more widely than light diffusers 31*k* disposed near the center of optical component 30C in the longitudinal direction do.

Moreover, likewise, among a plurality of light diffusers, each light diffuser 31*m* disposed near a second end of optical component 30C has a light distribution direction which is inclined toward the second end with respect to the light distribution direction of the lighting apparatus. The second end of optical component 30C is in the longitudinal direction of optical component 30C. In Embodiment 2, as FIG. 9 illustrates, the light distribution direction of each of light diffusers 31*j* and 31*m* disposed near the first and second ends of optical component 30C is inclined by angle α with respect to the positive Z-axis direction. Here, the term "light distribution direction" of light diffuser 31*i* refers to the direction of the axis of distribution of light output from light diffuser 31*j* when light enters light diffuser 31*j* in the positive Z-axis direction. The term "near the first end" refers to that the distance from the first end is approximately 30% or less of the longitudinal length of optical component 30C. The similar definition also applies to the terms "near the second end" and "near the center". Moreover, in Embodiment 2, the light distribution direction of each light diffuser 31*k* disposed near the center of optical component 30C corresponds to the light distribution direction of the lighting apparatus (the positive Z-axis direction) (see the dotted and dashed lines in FIG. 9). Accordingly, light emitted from near longitudinal, first and second ends of the lighting apparatus is diffused in the longitudinal direction of lighting apparatus 10. In other words, wider light diffusion of lighting apparatus 10 in the Y-axis direction in FIG. 4A is provided. Accordingly, in the lighting system where two lighting apparatuses are longitudinally aligned, uneven illuminance caused near gap 123 between two lighting apparatuses can be reduced.

In the above description, the light distribution direction of each of light diffusers 31*j* and 31*k* disposed near the first and second ends of optical component 30C is inclined. However, it may be that only the light distribution directions of light diffusers disposed near the first end may be inclined. It may also be that the inclinations of the light distribution directions of light diffusers 31*j* are different from those of light diffusers 31*m*. Such configurations can also provide wider light diffusion of the lighting apparatus in the longitudinal direction.

[2-2. Variation 1 of Embodiment 2]

A lighting apparatus according to Variation 1 of Embodiment 2 will be described with reference to FIG. 10. In the lighting apparatus according to Variation 1 of Embodiment 2, the configurations of inclinations of the light distribution directions of light diffusers of optical component 30D are different from those of optical component. 30C according to Embodiment 2. The other configurations are similar to those of optical component 30C according to Embodiment 2. An optical component according to Variation 1 of Embodiment 2 will be described below.

Figure 10:
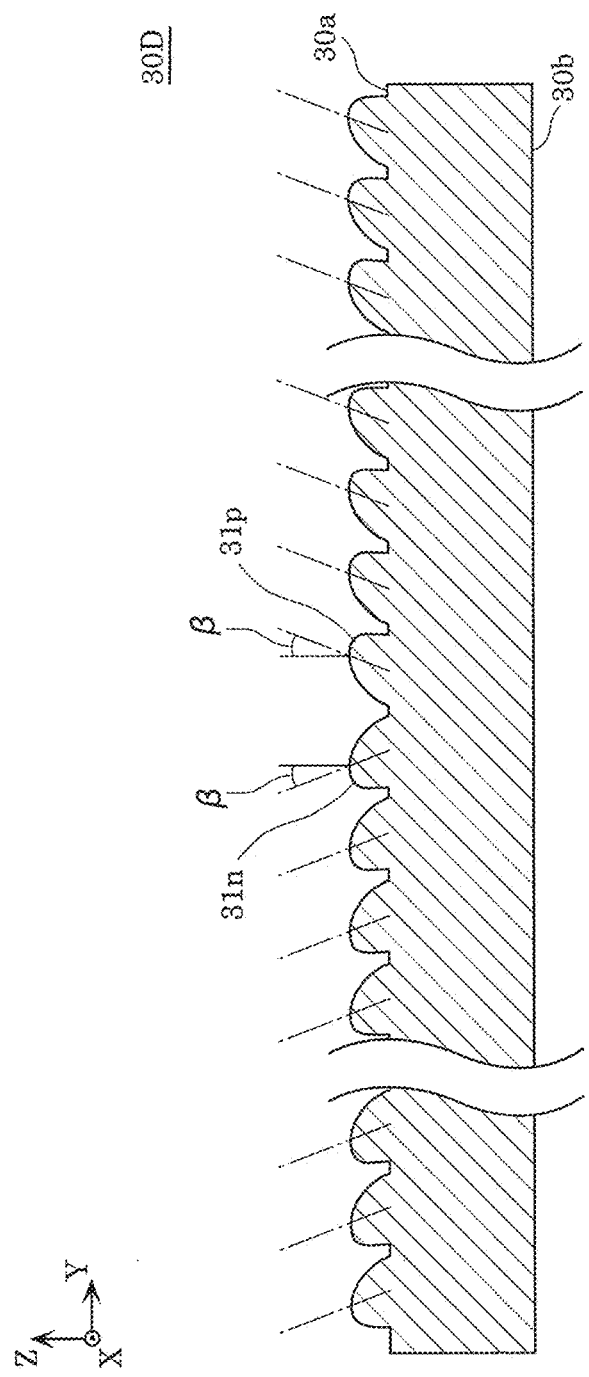
FIG. 10 is a cross-sectional view of a configuration an optical component according to Variation 1 of Embodiment 2.

FIG. 10 is a cross-sectional view of a configuration of optical component 30D according to Variation 1 of Embodiment 2. FIG. 10 is a cross-sectional view which corresponds to the cross-sectional view of optical component 30C illustrated in FIG. 9 according to Embodiment 2.

As FIG. 10 illustrates, in optical component 30D according to Variation 1 of Embodiment 2, among a plurality of light diffusers, the light diffusers, disposed in a region from a first end to the center of optical component 30D, have light distribution directions which are inclined toward the first end with respect to the light distribution direction of the lighting apparatus. The first end and the center of optical component 30D are in the longitudinal direction of optical component 30D. In other words, as FIG. 10 illustrates, among a plurality of light diffusers, light diffusers 31*n*, disposed in a region from the end of optical component 30D on the negative Y-axis side to the center of optical component 30D in the Y-axis direction, have light distribution directions which are inclined toward the negative Y-axis with respect to the positive Z-axis direction. With this, in Variation 1 of Embodiment 2, among a plurality of light diffusers, at least one of light diffusers 31*n* disposed near the first end diffuses light from linear light source 20, toward the first end side more widely than light diffusers 31.*p* disposed near a second end of optical component 30D in the longitudinal direction.

Moreover, among a plurality of light diffusers, light diffusers disposed in a region from the second end to the center of optical component 30D have light distribution directions which are inclined toward the second end with respect to the light distribution direction of the lighting apparatus. In other words, in the example of Variation 1 of Embodiment 2, the light distribution directions of all of the light diffusers are inclined with respect to the light distribution direction of the lighting apparatus. Moreover, in the example of Variation 1 of Embodiment 2, as FIG. 10 illustrates, the light distribution direction of each of light diffusers 31*n* and 31*p* of optical component 30D is inclined by angle β with respect to the positive Z-axis direction.

In Variation 1 of Embodiment 2, too, light emitted from the lighting apparatus is diffused in the longitudinal direction of the lighting apparatus. Accordingly, in the lighting system where two lighting apparatuses are longitudinally aligned, uneven illuminance caused near gap 123 between two lighting apparatuses can be reduced.

In the above description, the light distribution directions of all of the light diffusers of optical component 30D are inclined; however, it may be that only the light distribution directions of the light diffusers disposed in a region from the first end to the center may be inclined. It may also be that the inclinations of the light distribution directions of light diffusers 31*n* are different from those of light diffusers 31*p*. Such configurations can also provide wider light diffusion of the lighting apparatus in the longitudinal direction.

[2-3. Variation 2 of Embodiment 2]

Variation 2 of Embodiment 2 will be described with reference to FIG. 11. In Variation 2 of Embodiment 2, the configurations of the inclinations of the light distribution directions of the light diffusers are different from those of the lighting apparatus according to Embodiment 2. The other configurations are similar to those of lighting apparatus according to Embodiment 2.

Figure 11:
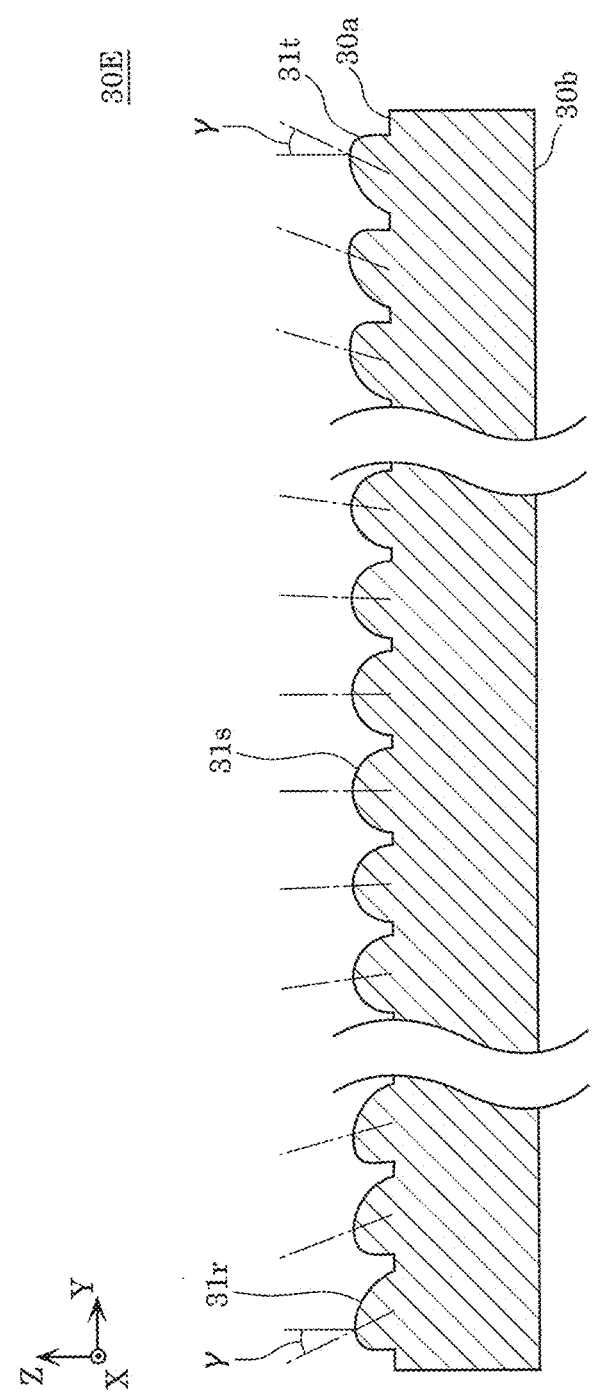
FIG. 11 is a cross-sectional view of a configuration of an optical component according to Variation 2 of Embodiment 2.

FIG. 11 is a cross-sectional view of a configuration of optical component 30E according to Variation 2 of Embodiment 2. FIG. 11 is a cross-sectional view which corresponds to the cross-sectional view of optical component 30C illustrated in FIG. 9 according to Embodiment 2.

As FIG. 11 illustrates, in Variation 2 of Embodiment 2, the light distribution directions of the light diffusers disposed in a region from a first end to the center of optical component 30E have light distribution directions which are inclined toward the first end with respect to the light distribution direction of the lighting apparatus. The inclination gradually increases from the center toward the first end. The center and the first end of optical component 30E are in the longitudinal direction of optical component 30E. In other words, in FIG. 11, among a plurality of light diffusers, for example, the light diffusers disposed in a region from the end on the negative Y-axis side to the center of optical component 30E in the Y-axis direction have light distribution directions which are inclined toward the negative Y-axis with respect to the positive Z-axis direction. The inclination gradually increases from the center toward the end. With this, in Variation 2 of Embodiment 2, among a plurality of light diffusers, at least one of the light diffusers disposed near the first end of optical component 30E diffuses light from linear light source 20, toward the first end side more widely than the light diffusers disposed near the center do.

Moreover, in FIG. 11 according to Variation 2 of Embodiment 2, the light diffusers disposed in a region from the end on the positive Y-axis side to the center of optical component 30E in the Y-axis direction have light distribution directions which are inclined toward the positive Y-axis with respect to the positive Z-axis direction. The inclination gradually increases from the center toward the end.

As FIG. 11 illustrates, the light distribution direction of each of light diffuser 31s disposed near the center of optical component 30E in the Y-axis direction substantially corresponds to the light distribution direction of the lighting apparatus (the positive Z-axis direction). The inclinations of the light distribution directions of the light diffusers gradually increase from the center toward the first and second ends of optical component 30E in the Y-axis direction. The angle of the inclination of each of light diffusers 31r and 31t disposed near the first and second ends is γ.

In Variation 2 of Embodiment 2, too, light emitted from the lighting apparatus is diffused in the longitudinal direction of the lighting apparatus. Accordingly, in the lighting system where two lighting apparatuses are longitudinally aligned, uneven illuminance caused near gap 123 between two lighting apparatuses can be reduced. Moreover, in Variation 2 of Embodiment 2, since the Eight distribution directions of the light diffusers gradually increase from the center toward the first end of optical component 30E, the difference in light distribution direction between adjacent light diffusers can be reduced. This can further reduce unevenness of illumination light of the lighting apparatus.

In the above description, all the light diffusers of optical component 30E, excluding the light diffusers disposed near the center, have light distribution directions which are inclined; however, it may be that only the light distribution directions of the light diffusers disposed in a region from the first end toward the center is inclined. It may also be that the inclinations of the light distribution directions of light diffusers 31r are different from those of light diffusers 31t. Such configurations can also provide rider light diffusion in the longitudinal direction of lighting apparatus.

[4. Advantageous Effects Etc.]

As described above, in the lighting apparatus according to Embodiment 2, among a plurality of light diffusers, light diffusers 31j disposed near the first end of optical component 30 have light distribution directions which are inclined toward the first end with respect to the light distribution direction of the lighting apparatus.

As described above, the lighting apparatuses according to Embodiment 2, Variation 1, and Variation 2 include an optical component including a plurality of light diffusers. This can reduce unevenness of illumination light. Moreover, the lighting apparatus can diffuse light in the longitudinal direction. Hence, even when a plurality of lighting apparatuses are longitudinally aligned, it is possible to reduce generation of unevenness (dark spot) near gap 123 between adjacent; lighting apparatuses.

Moreover, in the lighting apparatus according to Variation 1 of Embodiment 2, it may be that among a plurality of light diffusers, light diffusers 31n disposed in a region from the first end to the center may have light distribution directions which are inclined toward the first end with respect to the light distribution direction of the lighting apparatus.

Moreover, in the lighting apparatus according to Embodiment 2, it may be that, among a plurality of light diffusers, the light diffusers disposed in a region from the first end to the center have light distribution directions which are inclined toward the first end with respect to the light distribution direction of the lighting apparatus. The inclination may gradually increase from the center toward the first end.

This reduces the difference in light distribution direction between adjacent light diffusers, leading to a further reduction in unevenness of illumination light of the lighting apparatus.

Other Embodiments

The lighting apparatus and the moving object according to the present disclosure have been described based on the above embodiments and variations thereof. However, the present disclosure is not limited to the above embodiments and variations thereof.

For example, in the above embodiments and variations thereof, light diffusers are used to cause the optical component to diffuse light; however, a light diffusing unit other than the light diffusers may be used. For example, diffusing materials may be dispersed in the optical component. This can further reduce unevenness of illumination light. Moreover, diffusing materials can be used to increase the light distribution angle of the lighting apparatus. For example, diffusing materials are dispersed in an optical component including concave light diffusers so as to have a haze value of 50% approximately. This can increase the light distribution angle in the direction perpendicular to the longitudinal direction of the optical component by approximately 7 degrees. In this case, center intensity (luminous intensity in the direction perpendicular to the exit surface of the optical component of the lighting apparatus) is reduced to approximately 56% of the case where no diffusing material is used.

Moreover, emboss processing may be applied to the exit surface of the optical component to cause the optical component to diffuse light. Emboss processing can be implemented by, for example, blasting.

Moreover, in the above embodiments and variations thereof, the optical component has a plate-like shape; however, the optical component may have another shape. For example, hybrid lenses may be disposed on the optical component on the linear light source 20 side.

Moreover, in the above embodiments and variations thereof, linear light source 20 is used; however, as a light source for the lighting apparatus, any light source may be used which can cause an elongated lighting apparatus to emit illumination light in a substantially uniform manner.

Moreover, in the above embodiments and variations thereof, the light diffusers are disposed on exit surface 30a of the optical component: however, for example, when no Fresnel lens is disposed on entrance surface 30b, the light diffusers may be disposed on entrance surface 30b.

Moreover, in Variation 2 of Embodiment 1 above, the light diffusers having convex curved surfaces are substantially the same in height H; however, the same configuration may be adapted when light diffusers have concave curved surfaces. When the optical component includes light diffusers having concave curved surfaces, the depth of the concave portion can be defined as height H.

Moreover, in the above embodiments and variations thereof, the light source is not limited to the linear light source. Any light source may be used which can cause a lighting apparatus to emit substantially uniform illumination light through the exit surface of the elongated optical component. For example, as a light source, LED elements which are arranged in a matrix may be used.

Moreover, as the LED elements included in linear light source 20, an SMD (surface mount device) light-emitting module may be used in which SMD LEDs are mounted on substrate 21, or a COB (chip on board) light-emitting module may be used in which LED chips are directly mounted on substrate 21. Other solid-state light-emitting elements such as an organic EL (electro luminescence) element may also be used.

In the lighting system, two lighting apparatuses may be disposed adjacent to each other without gap 123. The light output near the ends of the lighting apparatus is generally weak. Hence, even when two lighting apparatuses are disposed adjacent to each other, unevenness of illumination light (dark spot) may be generated near the ends of the two lighting apparatuses. Accordingly, by configuring a lighting system including the lighting apparatuses according to the above embodiments and variations thereof, unevenness of illumination light generated near the ends of the lighting apparatuses can be reduced even with the above arrangement.

Moreover, in the above embodiments and variations thereof, airplane 100 has been described as an example of the moving object to which the lighting apparatuses are applied; however, the moving object is not limited to the example. For example, the lighting apparatuses may be applied to, for example, trains, buses, boats and vessels. Moreover, the lighting apparatuses may be applied to other than the moving object.

Forms obtained by various modifications to the embodiments and the variations thereof that can be conceived by a person of skill in the art as well as forms realized by arbitrarily combining structural elements and functions in the embodiments which are within the scope of the essence of the present disclosure are included in the present disclosure.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. A lighting apparatus having an elongated shape, the lighting apparatus comprising:
    a light source; and
    an optical component which has an elongated shape and transmits light emitted from the light source, the optical component having (i) an elongated entrance surface where the light emitted from the light source enters and (ii) an elongated exit surface where the light which has entered the elongated entrance surface exits, the optical component including a plurality of light diffusers,
    wherein, of the plurality of light diffusers, at least one of light diffusers disposed near a first end of the optical component diffuses the light emitted from the light source, toward a first end-side of the optical component over a wider range than either one of (i) the light diffusers disposed near a second end of the optical component diffuse the light and (ii) light diffusers disposed near a center of the optical component diffuse the light, the first end, the second end, and the center of the optical component being in a longitudinal direction of the optical component
    wherein light distribution angles of the light diffusers gradually and monotonically increase from the center of the optical component toward the first end of the optical component.

2. The lighting apparatus according to claim 1,
    wherein the plurality of light diffusers have light distribution angles which are greater near the first end of the optical component than near the center of the optical component, the light distribution angles being in the longitudinal direction of the optical component.

3. The lighting apparatus according to claim 2,
    wherein each of the plurality of light diffusers has a curved surface which is substantially spherical, and
    a radius of curvature of the curved surface near the first end of the optical component is less than a radius of curvature of the curved surface near the center of the optical component.

4. The lighting apparatus according to claim 3,
    wherein the plurality of light diffusers have substantially a same height in a thickness direction of the optical component.

5. The lighting apparatus according to claim 1,
    wherein, among the plurality of light diffusers, a light diffuser disposed near the first end of the optical component has a light distribution direction that is inclined toward the first end of the optical component with respect to a light distribution direction of the lighting apparatus.

6. The lighting apparatus according to claim 5,
    wherein, among the plurality of light diffusers, each of light diffusers disposed in a region from the first end of the optical component to the center of the optical component has a light distribution direction that is inclined toward the first end of the optical component with respect to the light distribution direction of the lighting apparatus.

7. The lighting apparatus according to claim 5,
    wherein, among the plurality of light diffusers, each of light diffusers disposed in a region from the first end of the optical component to the center of the optical component has a light distribution direction that has an inclination toward the first end of the optical component with respect to the light distribution direction of the lighting apparatus, the inclination gradually increasing from the center of the optical component toward the first end of the optical component.

8. The lighting apparatus according to claim 1,
    wherein the optical component includes a Fresnel lens on the elongated entrance surface, the Fresnel lens condensing the light which has entered the elongated entrance surface, in a direction perpendicular to the longitudinal direction.

9. The lighting apparatus according to claim 1, wherein each of the plurality of light diffusers has a convex curved surface.

10. The lighting apparatus according to claim 1, wherein each of the plurality of light diffusers has a concave curved surface.

11. A lighting system comprising
the lighting apparatus according to claim 1,
wherein the lighting apparatus comprises two lighting apparatuses, and
the two lighting apparatuses are aligned in the longitudinal direction.

12. A moving object comprising
the lighting apparatus according to claim 1.

13. The lighting apparatus according to claim 1, wherein the at least one light diffuser comprises at least two light diffusers.

14. The lighting apparatus according to claim 1, wherein the optical component diffuses light emitted from the light source in the longitudinal direction of the optical component and condenses light emitted from the light source in a direction orthogonal to the longitudinal direction.

15. The lighting apparatus according to claim 1, wherein the near a first end of the optical component, the near a second end of the optical component and the near a center of the optical component each refer to a distance that is approximately 30% of the longitudinal length of the optical component.

16. The lighting apparatus according to claim 1, wherein the optical component diffuses light emitted from the light source in the longitudinal direction of the optical component without diffusing light emitted from the light source in a direction transverse to the longitudinal direction.

* * * * *